United States Patent
Minegishi

(10) Patent No.: US 8,607,219 B2
(45) Date of Patent: Dec. 10, 2013

(54) INFORMATION PROCESSING DEVICE AND A FIRMWARE UPDATING METHOD OF THE INFORMATION PROCESSING DEVICE

(75) Inventor: Akira Minegishi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 347 days.

(21) Appl. No.: 12/987,525

(22) Filed: Jan. 10, 2011

(65) Prior Publication Data

US 2011/0179407 A1 Jul. 21, 2011

(30) Foreign Application Priority Data

Jan. 15, 2010 (JP) ................................ 2010-006640

(51) Int. Cl.
*G06F 9/44* (2006.01)

(52) U.S. Cl.
USPC ............ 717/170; 717/168; 717/171; 717/173

(58) Field of Classification Search
None
See application file for complete search history.

(56) References Cited

U.S. PATENT DOCUMENTS

| | | | | |
|---|---|---|---|---|
| 6,832,373 | B2 * | 12/2004 | O'Neill ......................... | 717/171 |
| 7,243,347 | B2 * | 7/2007 | Palmer et al. ................. | 717/170 |
| 7,681,191 | B2 * | 3/2010 | Yuuki ............................ | 717/170 |
| 7,747,997 | B1 * | 6/2010 | Rao ................................ | 717/170 |
| 7,979,855 | B2 * | 7/2011 | Inui et al. ...................... | 717/173 |
| 8,032,881 | B2 * | 10/2011 | Holmberg et al. ............ | 717/171 |
| 8,185,886 | B2 * | 5/2012 | Rothman et al. ............. | 717/173 |
| 2003/0074657 | A1 * | 4/2003 | Bramley, Jr. .................. | 717/168 |
| 2004/0073902 | A1 * | 4/2004 | Kao et al. ...................... | 717/171 |
| 2004/0153738 | A1 | 8/2004 | Otaka et al. | |
| 2005/0055595 | A1 | 3/2005 | Frazer et al. | |
| 2005/0240932 | A1 * | 10/2005 | Billau et al. ................... | 718/104 |
| 2006/0053274 | A1 | 3/2006 | Nyuugaku et al. | |
| 2006/0130039 | A1 * | 6/2006 | Yuuki ............................ | 717/168 |
| 2006/0174240 | A1 * | 8/2006 | Flynn ............................ | 717/170 |
| 2008/0263312 | A1 * | 10/2008 | Sater et al. .................... | 711/173 |
| 2009/0063766 | A1 * | 3/2009 | Matsumura et al. .......... | 711/113 |
| 2009/0222650 | A1 * | 9/2009 | Chen ................................ | 713/1 |
| 2009/0241103 | A1 * | 9/2009 | Pennisi et al. ................ | 717/173 |
| 2010/0199078 | A1 * | 8/2010 | Shih et al. ......................... | 713/2 |
| 2010/0241838 | A1 * | 9/2010 | Cohen et al. ..................... | 713/2 |
| 2010/0313191 | A1 * | 12/2010 | Yin et al. ...................... | 717/168 |
| 2011/0119662 | A1 * | 5/2011 | Chen et al. .................... | 717/168 |

FOREIGN PATENT DOCUMENTS

| | | |
|---|---|---|
| EP | 0790554 A1 | 8/1997 |
| FR | 2903791 A1 | 1/2008 |
| JP | 2000-105750 A | 4/2000 |

(Continued)

OTHER PUBLICATIONS

Kent D. Wilken, Concurrent Detection of Software and Hardware Data-Access Faults, 1997, pp. 413-420.*

(Continued)

*Primary Examiner* — Thuy Dao
*Assistant Examiner* — Mongbao Nguyen
(74) *Attorney, Agent, or Firm* — Fujitsu Patent Center

(57) ABSTRACT

An information processing device which is separated a plurality of partitions updates a firmware program in each partition. A management unit monitors the partition in operation and receives the firmware program from an external device and transmits the firmware program to each of the partition. Each partition writes and updates the firmware program in one memory area which is not used in operation out of a pair of memory area to perform an update of the firmware without stopping the operation of the partition.

12 Claims, 12 Drawing Sheets

(56) References Cited

FOREIGN PATENT DOCUMENTS

| JP | 2001-222431 A | 8/2001 |
|---|---|---|
| JP | 2004-199277 | 7/2004 |
| JP | 2005-502971 | 1/2005 |
| JP | 2006-79155 A | 3/2006 |
| JP | 2006-146709 | 6/2006 |
| JP | 2008-282090 A | 11/2008 |

OTHER PUBLICATIONS

Peter Mell, Creating a Patch and Vulnerability Management Program, 2005, pp. (4-1)-(4-7).*

Kayhan, An ASIP Design Methodology for Embedded Systems, 1999, pp. 1-4.*

Extended European Search Report mailed May 25, 2011 for corresponding European Application No. 11150652.3.

IMB xSeries, "Updating Your xSeries Firmware: Best Practices," Dec. 2005, 10 pages, with English-language Translation.

Japanese Office Action mailed Aug. 27, 2013 for corresponding Japanese Application No. 2010-006640, with Partial English-language Translation.

Japanese Office Action mailed Apr. 30, 2013 for corresponding Japanese Application No. 2010-006640, with Partial English-language Translation.

* cited by examiner

FIG.4

| AGGREGATED VERSION | MMB<br>MMB VERSION | SB<br>BMC VERSION | SB<br>BIOS VERSION | COMPATIBILITY |
|---|---|---|---|---|
| V01 | 01 | 01 | 01 | × |
| V02 | 02 | 02 | 02 | ○ |
| V03 | 03 | 03 |  | ○ |
| V04 | 04 |  |  | ○ |
| V05 | 05 | 04 |  | ◎ |

INFORMATION PROCESSING DEVICE AND A FIRMWARE UPDATING METHOD OF THE INFORMATION PROCESSING DEVICE

CROSS-REFERENCE TO RELATED APPLICATION

This application is based upon and claims the benefit of priority of the prior Japanese Patent Application No. 2010-6640, filed on Jan. 15, 2010, the entire contents of which are incorporated herein by reference.

FIELD

The embodiments discussed herein are related to an information processing device and a firmware updating method of the information processing device.

BACKGROUND

An information processing device, for example, a server system, operates by separating a hardware resources such as a CPU (Central Processing Unit) as a processor) and a memory as main memory unit into several partitions physically or logically. Each partition is capable of operating an OS (Operating System) by the CPU, and of executing application job (program) through the operation of the OS. In other words, the server system includes several partitions which are capable of operating the OS, and operates several different or same OSes.

In this server system, a firmware program, which executes a work, an operation and management of the system, is used in each partition. This firmware program needs to be updated when necessary.

In such server system capable of operating several partitions, the updating method of the firmware program (hereafter called FW) in the partition has been to instruct the updating of each firmware to each partition.

Another updating method updates the FW while the partitions of the system are in operation by updating the FW of a service processor which manages the partitions online.

Patent Document 1: Japanese Laid-open Patent Publication No. 2006-079155.
Patent Document 2: Japanese National Publication of International Patent Publication No. 2005-502971.
Patent Document 3: Japanese Laid-open Patent Publication No. 2006-146709.

SUMMARY

In the server system operating several partitions, when updating the FW in the partition, the partition (job) is stopped before the updating starts every time the FW is updated. Also, when the hardware is replaced, the partition is started to confirm the version of the FW.

Therefore, the volume of work and the time consumed by confirming the version of the FW was tremendous. Also, when the process is actually applied, the job needed to be stopped before updating the FW and the down time was long.

Moreover, in the conventional updating method with the partition in operation, though the FW of the service processor may be updated while the partition is operated, to update the FW in the partition, the partition (job) is stopped before the updating operation starts.

Further, when there is non-compatibility between FWs, the update is executed with the partition stopped, and as a result, the down time will be even longer.

According to an aspect of the invention, an information processing device includes a plurality of processing unit which have a hardware resource including at least an arithmetic processing unit and a memory unit and operate an OS, and a system control unit which controls the plurality of processing units, and each of the processing units has a pair of memory areas which store a firmware program controlling the hardware resource, and the system control unit transmits a firmware program for updating received from an external device to each of the processing units, and each of the processing units writes to one memory area not used for the operation out of a pair of memory areas.

Further, according to another aspect of the invention, the firmware updating method of the information processing device which includes a plurality of processing units, which has a hardware resource including at least the arithmetic processing unit and the memory unit and operate the OS, and the system control unit which controls the plurality of processing units, the method includes: receiving the firmware for update from the external device; transmitting the received firmware program for update to each of the processing units; and writing the transmitted FW program to one memory area that is not used for operation out of a pair of memory areas which store the firmware program controlling the hardware resource.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is an explanatory diagram of a compatibility confirmation chart for the updating process in FIG. 3.

DESCRIPTION OF THE EMBODIMENT

The example of the embodiment is explained below with the information processing device, a method of firmware update, a firmware updating process in case there is compatibility between firmware, a firmware updating process in case there is non-compatibility between firmware, and other embodiment, but the disclosed information processing device is not limited to this embodiment.

In the following example, a firmware program is a control program for a work, an operation and management of the hardware of a whole system, such as a BIOS (Basic Input Output System).

(Information Processing Device)

Figure 1:
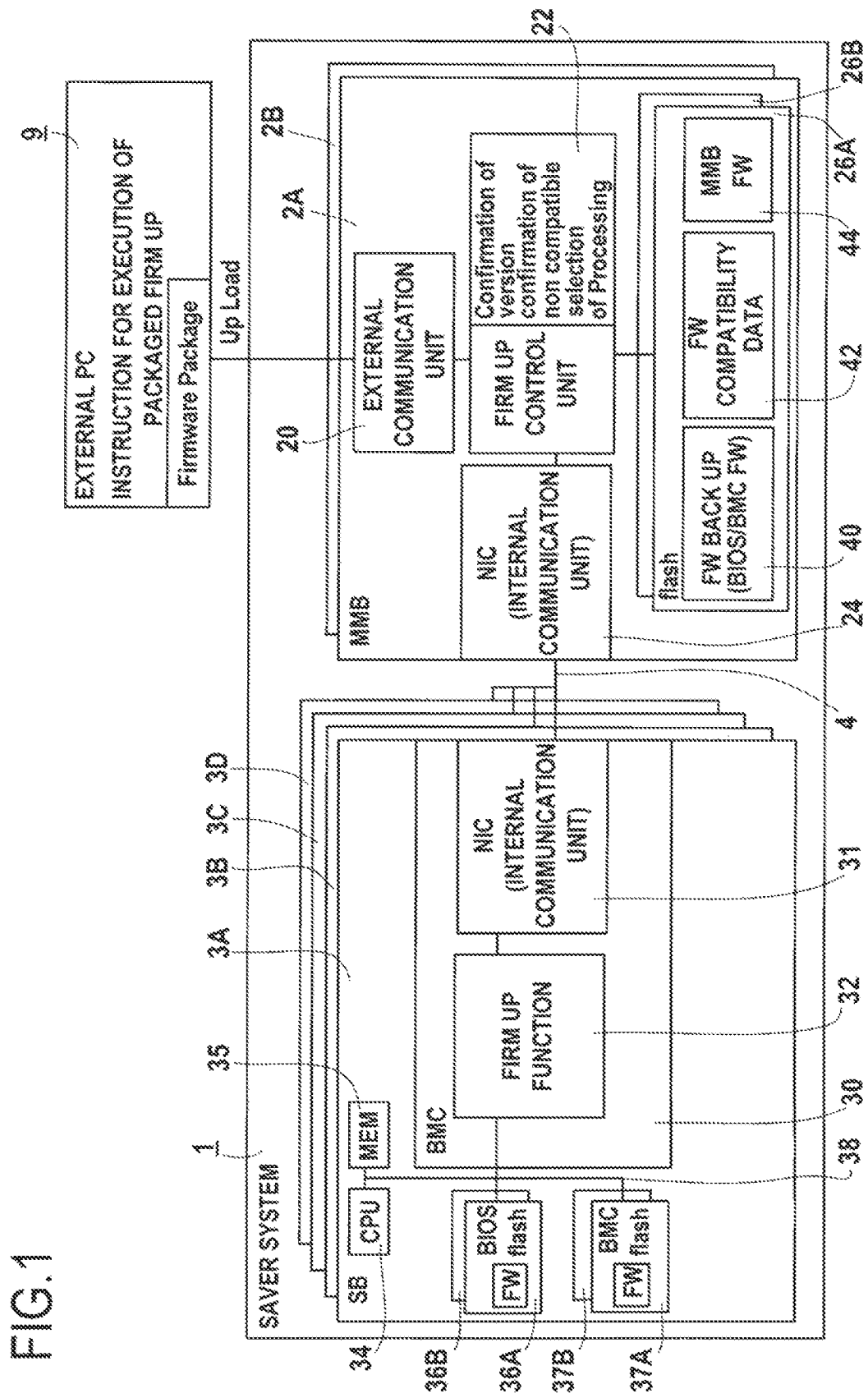
FIG. 1 is a configuration diagram of the information processing device according to an embodiment of this invention.

FIG. 1 is the configuration diagram of the information processing unit according to an embodiment of this invention. The information processing unit in FIG. 1 indicates a server system. The server system 1 includes System Boards (SBs) 3A to 3D as a plurality of processing units, and Management Boards (MMBs) 2A and 2B as so-called system control device (SVP; SerVice Processor). The management boards 2A and 2B configure redundant system and one side of the management board is active and the other side of the management board is standby.

Each of the system boards 3A to 3D are configured with a CPU 34 as the arithmetic processing unit, a memory 35 and so on mounted on a circuit board, and the CPU 34 operates the OS and executes necessary application program based on the operation of the OS, then processes the job.

Each of the system boards 3A to 3D connects to the management boards 2A and 2B through the communication path 4 such as LAN (Local Area Network). The management boards 2A and 2B monitor the status, start and stop control and more of the system boards 3A to 3D. Also, each of the system boards 3A and 3D is capable of communicating commands and data through other communication paths which are not indicated in the figures.

Each of the management boards 2A and 2B includes an external communication unit 20, a network interface card (called as NIC: Network Interface Card) 24, a CPU and a memory 22, and non-volatility memories 26A and 26B mounted on the circuit board. The external communication unit 20 connects to a device outside the server system (for example, PC (Personal Computer)) 9, then communicate with the connected device.

The CPU and the memory 22 connect to the external communication unit 20, the NIC 24, and the non-volatile memory 26A and 26B. The CPU and the memory 22, as explained later, execute the update of the firmware program. The non-volatile memories 26A and 26B includes rewritable non-volatile memories, and a flash memory, for example, is preferable.

The non-volatile memories 26A and 26B are provided in pair for the redundant configuration purpose, and have a storing area 40 for storing a firmware program for backup (BIOS (Basic Input/Output System)), a storing area 42 for storing the information for confirming compatibility of firmware (described later in FIG. 9), and a storing area 44 for storing the firmware program on the management boards 2A and 2B. The NIC 24 is provided for communicating with each of the system boards 3A to 3D through the communication path 4.

Also, each of the system boards 3A to 3D includes the CPU 34, the memory 35, a base management controller (BMC: Base Management Controller) 30, a pair of non-volatile memories (called BIOS memory) 36A and 36B which store the BIOS, a pair of non-volatile memories (called BMC memory) 37A and 37B storing the firmware in the BMC, and a communication bus 38 which connects them.

The BMC 30 includes a network interface card 31 for communicating through the communication path 4 and the CPU 32 which executes updating process of the firmware and more. The BMC 30 executes a monitor of operations and a control of status in the system boards 3A-3D.

The pair of BIOS memories 36A and 36B forms a redundant system, and one side of the BIOS memories is active mode and the other of the BIOS memories is standby mode. The pair of BMC memories 37A and 37B also forms a redundant system, and one of the BMC memories is active mode and the other of the BMC memories is standby mode. These memories 36A, 36B, 37A, and 37B include rewritable non-volatile memories, and a flash memory, for example, is preferable.

On the other hand, the external device (for example, PC) 9 accesses a server system 1 through the internet from remote location. The external device 9 uploads the firmware program to the server system 1 by operating the web screen of the browser.

In this server system, each of the system boards 3A to 3D forms partition defined as a partition where each OS operates. The partition here is so-called physical partition. In such information processing device, the firmware program is updated to the new version of the firmware program for an improvement of function and a correction of an obstruction.

Also, in the server system, it is desirable that the operation in the partition is not to be stopped when updating the firmware program, because the information processing is executed based on the individual OSes in each partition.

(Firmware Updating Method)

Figure 2:
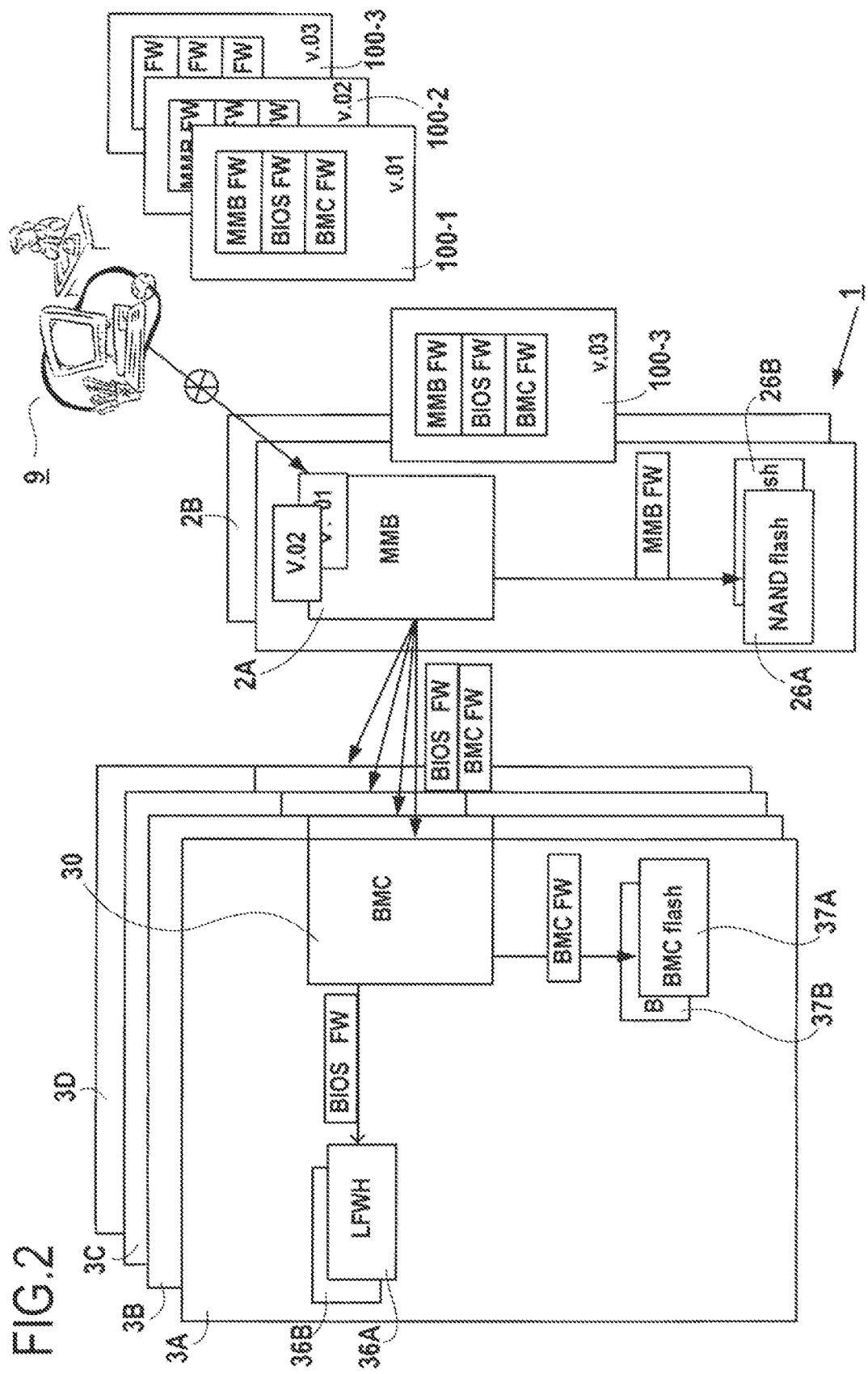
FIG. 2 is an explanatory diagram of the embodiment of the firmware updating process in the information processing device in FIG. 1.
Figure 3:
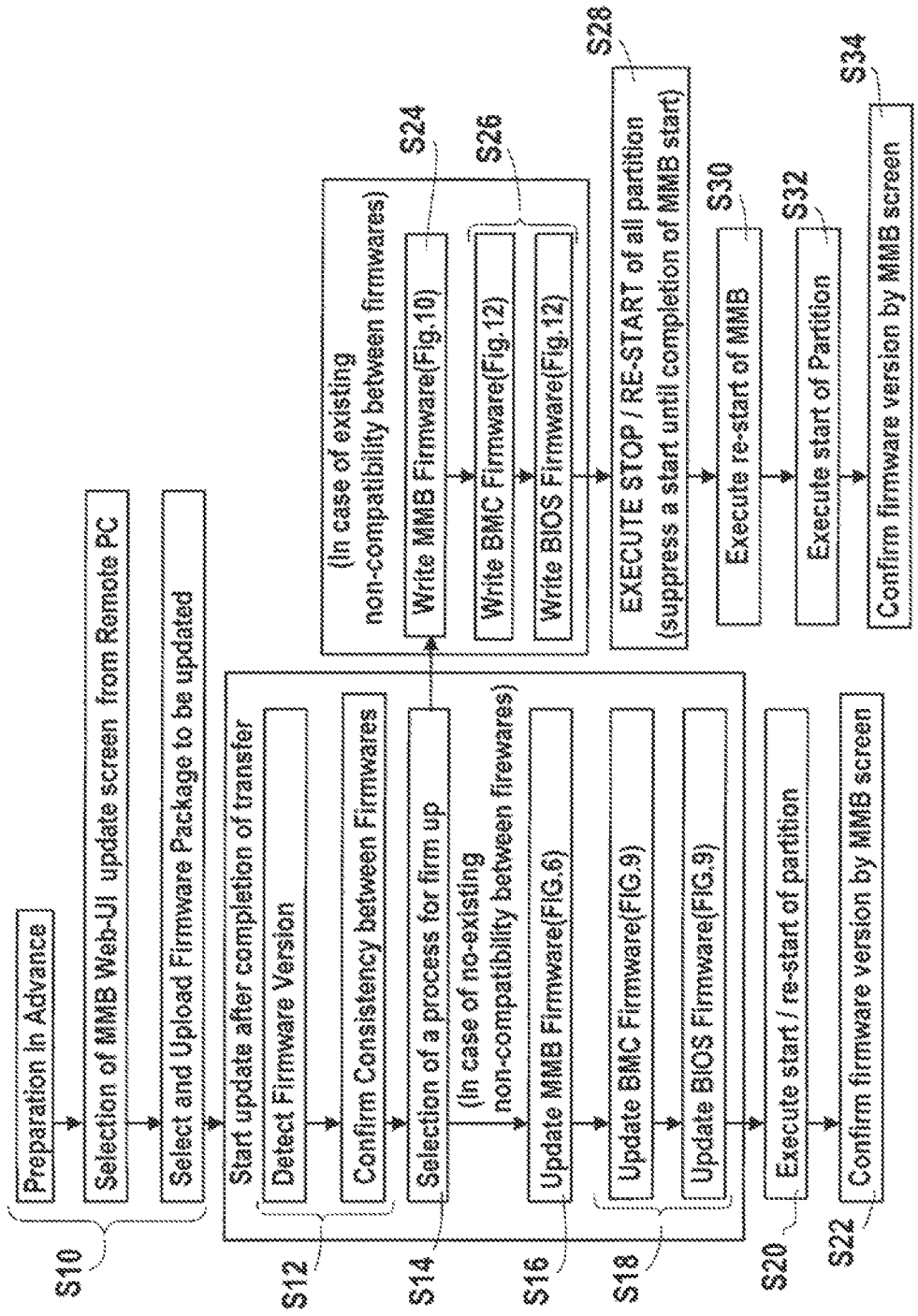
FIG. 3 is a flow diagram of the firmware updating process in FIG. 2.
Figure 5:
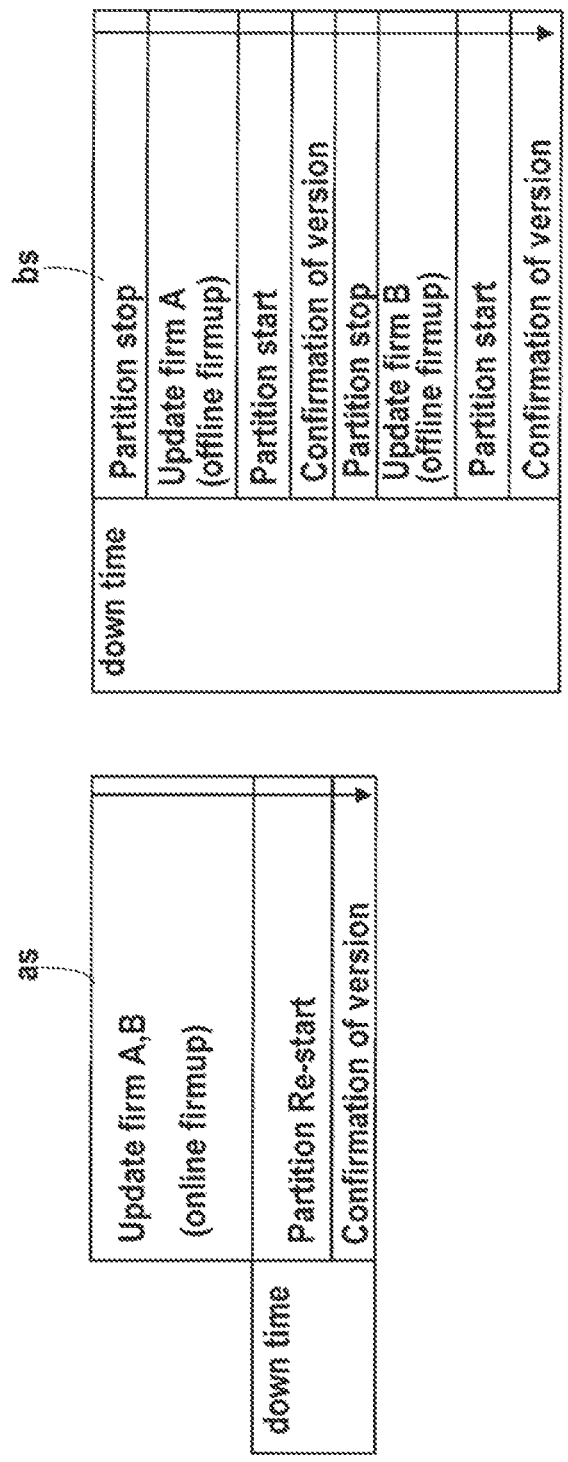
FIG. 5 is an explanatory diagram of the operation of the firmware update in FIG. 3.

FIG. 2 is the explanatory diagram of the embodiment of the firmware updating process in the information processing device in FIG. 1. FIG. 3 is the flow diagram of the firmware updating process in FIG. 2. FIG. 4 is the explanatory diagram of a compatibility confirmation chart for the updating process in FIG. 3. And FIG. 5 is the explanatory diagram of the operation of the firmware update in FIG. 3.

As illustrated in FIG. 2, the remote PC (external device) 9 stores the firmware programs 100-1 to 100-3 of each version (version v.01, version v.02, and version v.03). The server system 1 receives a package of firmware programs for updating from the external device 1 in case of the situation where the update of the firmware is needed for an improvement of function and a correction of obstruction.

In this example, as the MMB 2A in the server system 1 has already received and operated the firmware 100-2 of version v.02, the MMB 2A receives the firmware 100-3 of v.03 version which is further improved version. Here, the package of firmware programs includes the MMB firmware, the BIOS firmware, and the BMC firmware.

The MMB 2A stores the package of firmware and executes the firmware update. In other words, the MMB 2A writes the MMB firmware in the package of firmware to the non-volatile memory 26A which stands by out of the pair of non-volatile memories 26A and 26B.

Also, the MMB 2A transmits the BIOS firmware and BMC firmware in the package of the firmware to the BMC 30 in each of the system boards 3A to 3D. The BMC 30 writes the BIOS firmware to the non-volatile memory 36A which stands by out of the pair of BIOS memories 36A and 36B.

The detailed description follows using FIG. 3 referring to FIG. 4.

(S10) The remote PC 9 accesses the server system 1 through the network. By accessing of the PC 9, the web screen of the MMB 2A on the active side is displayed on the remote PC 9. The operator of the remote PC 9 starts an operation of updating the firmware by using the web screen to select and click the appropriate item of the firmware update to start the update. In the remote PC 9, each firmware used in the server system 1 is managed by individual version and handled as a package, and managed as a comprehensive version.

This package of the firmware includes the compatibility confirmation chart between other generation firmware (explained later in FIG. 4). The package of firmware is prepared beforehand at the work terminal such as the remote PC 9. The upload of the package of the firmware from the remote PC 9 to the MMB 2A in active side starts once the update is executed by the web screen accessing from the remote PC 9.

(S12) The MMB 2A on the active side starts updating after the transfer. In advance to the execution of the update of the firmware, the MMB 2A detects the version of the MMB firmware stored in the non-volatile memory 26A. Also, regarding the firmware stored in the non-volatile memories 36A, 36B, 37A, and 37B on the partitions (system boards) 3A to 3D, the non-volatile memories 36A, 36B, 37A, and 37B are supplied a power constantly even when the partitions 3A to 3D are not started. Therefore, the MMB 2A, which is the manager of the firmware update, inquires each of the partitions 3A to 3D and detects the version information of the BIOS and the BMC before starting the update.

The MMB 2A confirms the compatibility between firmware by the compatibility chart 42 between firmware included in the received a package of the firmware. As illustrated in FIG. 4, the compatibility chart 42 describes the compatibility of the version between the firmware to be updated as the information between the latest MMB firmware and the firmware of the system board in operation, while setting the MMB FW which is the key to the system management to the base point.

FIG. 4 describes the aggregated version (V01 to V05), the MMB version number of each aggregated version, the BMC version number, and the BIOS version number. Here, exemplified is the case of updating to the version five of the firmware. This compatibility chart describes the aggregated versions of the version one to version five (v.01 to v.05), the MMB versions, the BMC versions and the BIOS versions of each aggregated version, and whether there is Backward Compatibility between the firmware version vo.5 and the older firmware versions v.01 to v.04. In the example in FIG. 4, as illustrated with the cross mark, it is indicated that only the FW version v.01 is not compatible with the FW version v.05.

Then, the MMB 2A confirms the existence of compatibility between the received firmware and current firmware of each partition by referring to the compatibility chart in FIG. 4 with the detected versions of the MMB, the BMC, and the BIOS. The MMB 2A determines whether all of the target system boards are capable of normal online firmware update based on the confirmation result.

(S14) When the MMB 2A determines that the normal online firmware update is applicable, the MMB 2A selects the updating process without non-compatibility between the firmware. When the MMB 2A determines the normal online update is not possible, the MMB 2A selects the updating process with non-compatibility between firmware at the step S24.

(S16) When the normal online update (in case of existing non-compatibility between the firmware) is possible, the MMB 2A executes the update of the firmware on the MMB. In other words, the MMB 2A writes the MMB firmware to the MMB firmware area 44 in the non-volatile memory 26A. The written MMB firmware is reflected after re-starting of the MMB. As illustrated in FIG. 1, when the MMB 2A and 2B are operated with redundant system, one of the MMBs (in this example, 2B) is on the standby mode, and the other MMB (2A) is on the active side.

And, the MMB 2A on the active side updates in a order from the MMB 2B on the standby side to the MMB 2A on the active side. By that, the blank time of the system management and control of which the MMBs 2A and 2B execute may be prevented. This step is applicable whether the partitions 3A to 3D are in operation or stopped. The firmware update of the MMBs 2A and 2B are executed first as they are the components with the system managed uniformly and therefore required to accommodate to the latest version of the with an correction of the obstruction.

(S18) The MMB 2A on the active side executes the update of the firmware on the system board side which forms partitions after the MMB 2A completes firm up to the non-volatility memory 26A on the active side and the standby side. This process is executed in each system board of each partition concurrently when there is a plurality of the partitions. Also, this process is applicable when the partition is operated or stopped. In other words, the MMB 2A communicates the BMC 30 on each of the system boards 3A to 3D through the communication path 4 such as an I2C (Inter-Integrated Circuit) interface and instructs the firmware update. The MMB 2A transfers data for the firmware update (the BIOS firmware and the BMC firmware) to the BMC 30 on each of the system boards 3A to 3D.

The CPU 32 in the BMC 30 executes the update process of the firmware. In other words, the CPU 32 in the BMC 30 updates by writing the BIOS firmware to the BIOS non-volatile memory 36A on the standby side, and the BMC firmware to the BMC non-volatile memory 37A on the standby side.

Thus, the MMB 2A completes writing of the firmware on all of the system boards 3A to 3D without stopping the operation of each partition.

(S20) Then, the MMB 2A, after the next partition is started/re-started, immediately detects whether the re-start was done because of the error of the partition or not. The MMB 2A, when confirms that the re-start is not by the error of the partition, switches the non-volatile memory 26A to the active side, and the non-volatile memory 26B to the standby side. Also, the MMB 2A switches the BIOS non-volatile memory 36A on each of the system boards 3A to 3D to the active side, the BIOS non-volatile memory 36B to the standby side, the BMC non-volatile memory 37A to the active side, and the BMC non-volatile memory 37B to the standby side. The MMB 2A, when an error occurs in the partition and the reset is done before the update is completed, does not execute the witching process and re-starts with the original firmware (the firmware of the BIOS non-volatile memory 36B and the BMC non-volatile memory 37B not yet rewritten).

(S22) The MMB 2A, when the partition is started normally and the latest FW is reflected, displays the updated firm version on the web screen of the MMB 2A. As the remote PC 9 displays the web screen, the operator of the PC 9 confirms the updated firm version with this web screen and completes the update.

(S24) On the other hand, when the MMB 2A determines that the non-compatibility between the firmware exists at the step S14, the update of the MMB firmware is executed. In this embodiment, the MMB 2A writes the MMB firmware to the MMB firmware area 44 of the non-volatile memory 26B on the backup side. In other words, only the backup side is updated. The reflection of the applicable firmware by re-starting the MMB is not executed at this point.

(S26) The MMB 2A updates the firmware on the system board, which is the partition, after the firm up of the MMB in the non-volatile memory 26B on the backup side is completed. This process is executed in each system board of each partition concurrently when there is a plurality of partitions. Also, this process is applicable when the partition is operated or stopped. In other words, the MMB 2A communicates the BMC 30 which exists in each of the system boards 3A to 3D through the communication path 4 such as the I2C interface and instructs the firmware update. The MMB 2A transfers data for the firmware update (the BIOS firmware and the BMC firmware) to the BMC 30 on each of the system boards 3A to 3D.

The CPU 32 in the BMC 30 executes the update process of the firmware. In other words, the CPU 32 in the BMC 30 updates by writing the BIOS firmware to the BIOS non-volatile memory 36A on the standby side, and the BMC firmware to the BMC non-volatile memory 37A on the standby side.

Thus, the MMB 2A completes writing of the firmware on all of the system boards 3A to 3D without stopping the operation of each partition.

(S28) Then, the remote PC 9 instructs the MMB 2A to re-start all the partitions in operation. After the MMB 2A instructs to start all the partitions in operation, the MMB 2A suppresses (stops) the start of the partitions which have been instructed to start for the waiting of the start of the MMB.

(S30) The MMB 2A, once confirming the suppression of the re-start of the partition, switches the starting path of the MMB firmware. In other words, the MMB 2A switches the non-volatile memory 26B on the backup side to the active side, reads the MMB firmware from the non-volatile memory 26B, and then executes the re-start of the MMB 2A.

(S32) After confirming the normal start of the MMB 2A, the MMB 2A re-starts the suppressed partition. The MMB 2A confirms whether the partition started normally. As the BMC 30 has acknowledged that the firmware is updated at the step S26, when the partition is re-started, the BMC non-volatile memory 37A on the standby side is switched to that on the active side concurrently with the BIOS non-volatile memory 36A on the standby side being switched to that of the active side. Then, the MMB 2A re-starts after reading the BMC firmware and the BIOS firmware which are updated.

(S34) The MMB 2A, when the latest firmware is reflected and the partition is started normally, displays the updated firmware version on the web screen. The remote PC 9 displays the web screen so the operator of the PC 9 confirms the updated firm version with the web screen and completes the update.

FIG. 5 is the comparison diagram of the time chart of the firmware update in this embodiment marked by 'as' and that in the conventional method marked by 'bs'. Here, the example of updating two kinds of firmware A and B is used.

In the conventional example 'bs', the partition is stopped, a firmware A is updated, then the partition is started and the version is confirmed. Next, the partition is stopped again, a firmware B is updated, then after the update is completed, the partition is started and the version is confirmed. As the partition is stopped and the update is done offline, the down time is long.

On the other hand, in the embodiment 'as', the partition is not stopped and the firmware A and B are updated in a lump, then the partition is re-started and the version is confirmed. Therefore, the down time is shorter than the conventional example 'bs' as the partition is not stopped and the firmware A and B are updated in a lump. For example, in the conventional example, the down time is for two to three hours, and with this embodiment, the downtime is only for several ten minutes.

As explained above, in the server system which is capable of operating a plurality of partitions of which a plurality of OSes is operated such as large-size server, all firmware kinds which operate, monitor, and adjust the hardware can be updated all at once during the partition in operation through the user interface.

Also, it is realized to update the firmware without stopping the operation of the OS while the partition is in operation by writing the firmware to be updated to the memory and stopping only the re-start of the partition.

Here, even when there is any inconsistency between two kinds of firmware A and B or other firmware, the online update may be executed without stopping the partition in operation because of detecting the inconsistency before the updating process begins. And the FW update maybe executed with stopping only the operation of the re-start of the partition.

As the non-volatile memory storing area which stores the firmware is configured with the redundancy system of the active side and the back up side and only the backup side is to be updated, the versions of each firmware can be recognize before executing the FW update without obstruct of the partition in operation. Also, there is no need to re-start the stopped partition only to recognize the firmware version.

Moreover, the execution of the update in a lump maybe enforced with uniform management as each firmware is handled as a package and the information of the backward compatibility of the latest firmware against the old firmware editions is stored at the same time.

<Firmware Updating Process in Case of Existing Compatibility>

Figure 6:
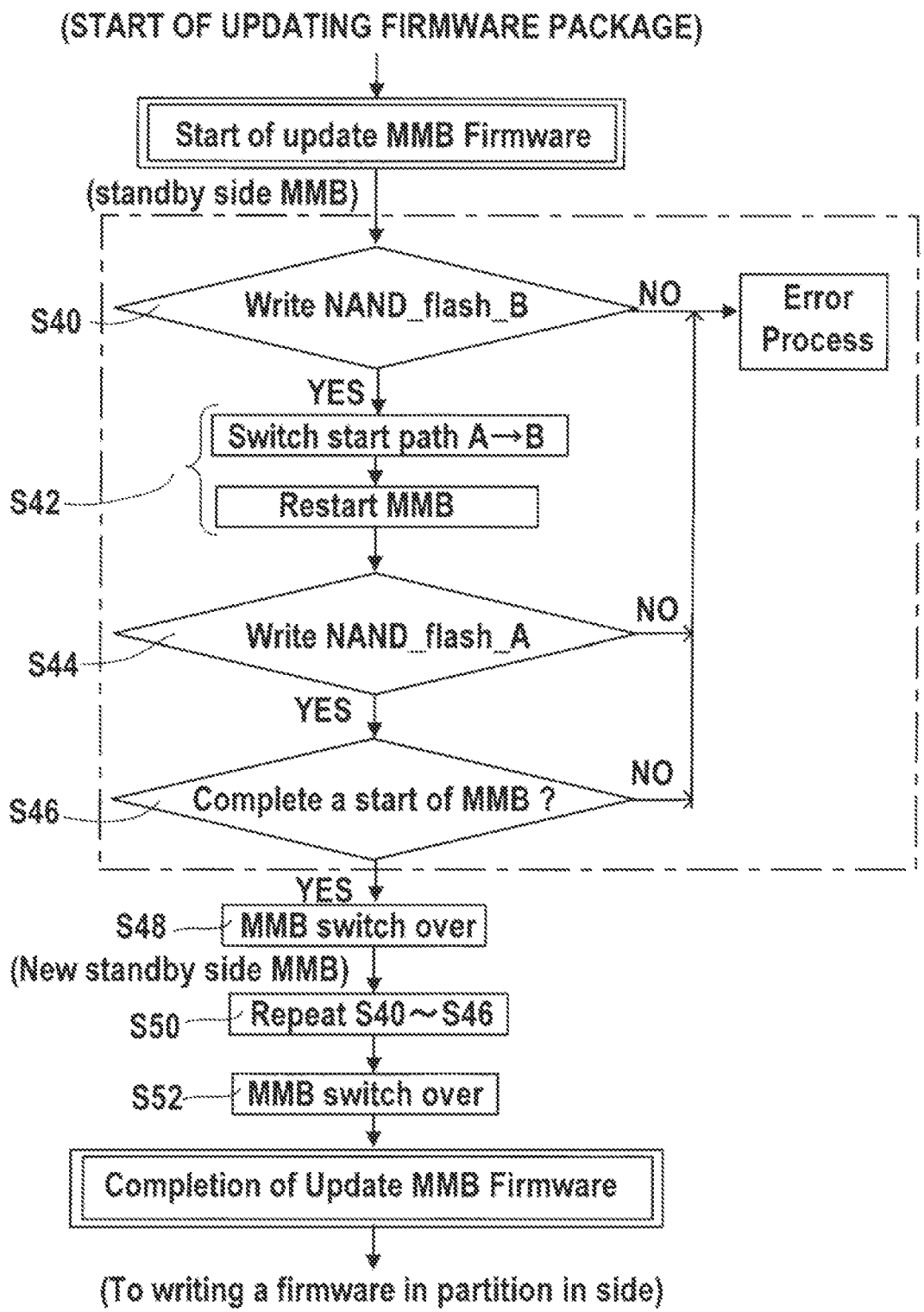
FIG. 6 is a flow diagram of the MMB firmware updating process explained in FIG. 3.
Figure 7:
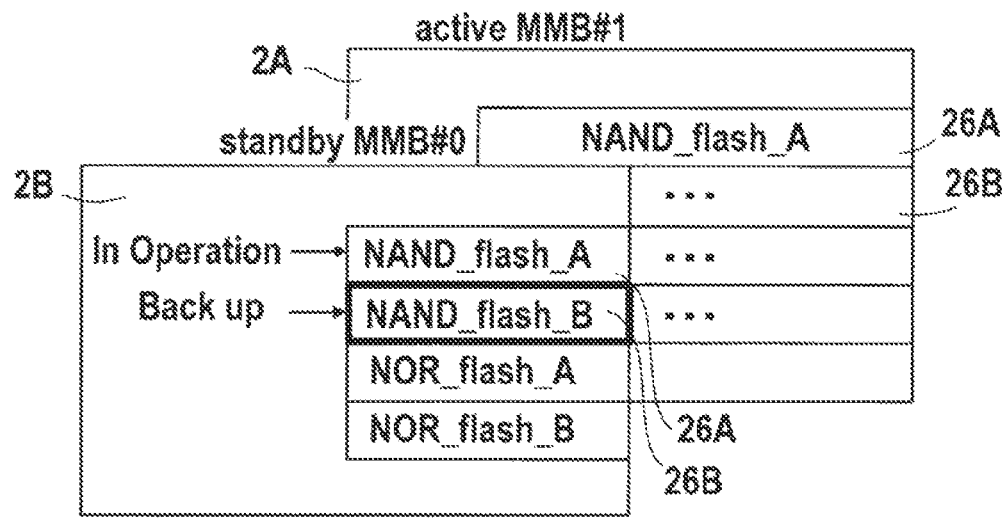
FIG. 7 is an explanatory diagram of updating operation of a non-volatility memory on the standby side in FIG. 6.
Figure 8:
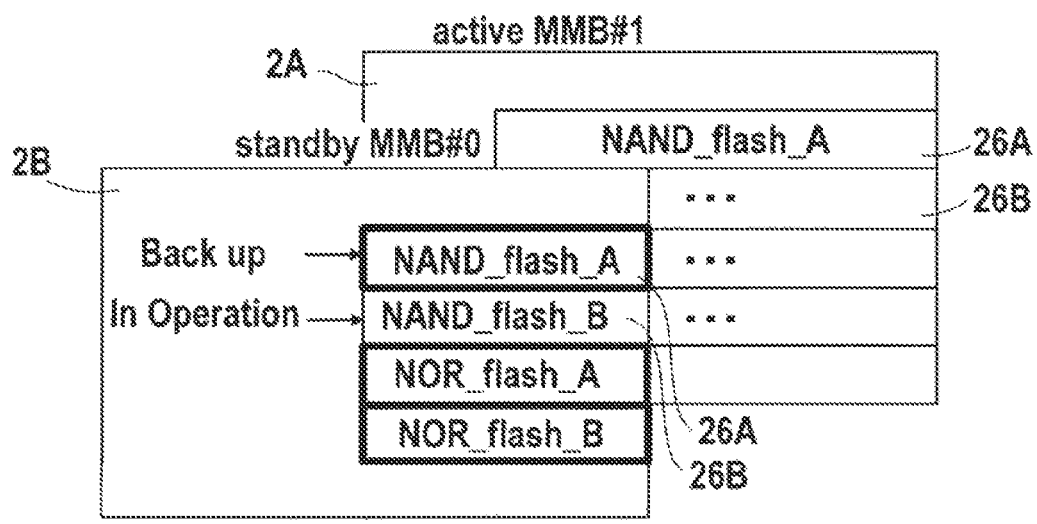
FIG. 8 is an explanatory diagram of updating operation of the non-volatility memory on the active side in FIG. 6.

Next, explained in detail is the firmware updating process with existing of compatibility (S16 and S18) as explained in FIG. 3. FIG. 6 is the flow diagram of the MMB firmware updating process explained in FIG. 3. FIG. 7 and FIG. 8 are the explanatory diagrams of the operation in FIG. 6. Hereafter the process flow in FIG. 6 is explained referring to FIG. 7 and FIG. 8.

(S40) The MMB 2A on the active side, when capable of the normal online (when there is no non-compatibility between firmware), executes the firmware update of the MMB. In other words, as illustrated in the FIG. 7, the MMB 2A on the active side writes the MMB firmware to the MMB firmware area 44 of the non-volatile memory 26B on the backup side (as illustrated by NAND flash B) in the MMB 2B on the standby side. The MMB 2A executes error process if the writing of the FW update is not successful.

(S42) The MMB 2A, when determines that the writing of the firmware update was successful, switches the non-volatile memory 26B of the MMB 2B on the standby side to the active side, and the non-volatile memory 26A to the standby side (that is, switching the starting path of the firmware). Then, the MMB 2A re-starts (resets) the MMB 2B on the standby side.

(S44) As illustrated in FIG. 8, the MMB 2A on the active side writes the MMB firmware to the MMB firmware area 44 in the non-volatile memory 26A (as illustrated by NAND flash A), which has been switched to the standby mode, on the MMB 2B on the standby side. The MMB 2A executes error process if the writing of the FW update is not successful.

(S46) When the MMB 2A determines that the writing of the firmware update was successful, the MMB 2A determines whether the activation of the MMB 2B is complete. In other words, the MMB 2A reads the non-volatile memories 26B and 26A on the MMB 2B on the standby side, confirms the Check Sum and version of the firmware, and then determines whether the activation is complete. The MMB 2A executes an error process if the activation of the MMB 2B on the standby side is not successful.

(S48) When the MMB 2A determines that the activation of the MMB 2B on the standby side was successful, the MMB 2A switches the MMB 2B on the standby side to the active side, and the MMB 2A to the standby side.

(S50) The MMB 2B, which has been switched to the active side, executes the process of the steps S40 to S46 to the MMB 2A which has been switched to the standby side.

(S52) When the MMB 2B determines that the activation of the MMB 2A on the standby side was completed successfully, the MMB 2B switches the MMB 2A on the standby side to the active side, and the MMB 2B itself on the active side to the standby side, to place them back to where they were. By that, the update of the MMB firmware is completed.

Thus, the blank time of the system management and control executed by the MMB 2A and 2B can be prevented while updating the MMB firmware on the MMB 2A and 2B. These steps can be executed while the partitions 3A to 3D are in operation or stopped.

Figure 9:
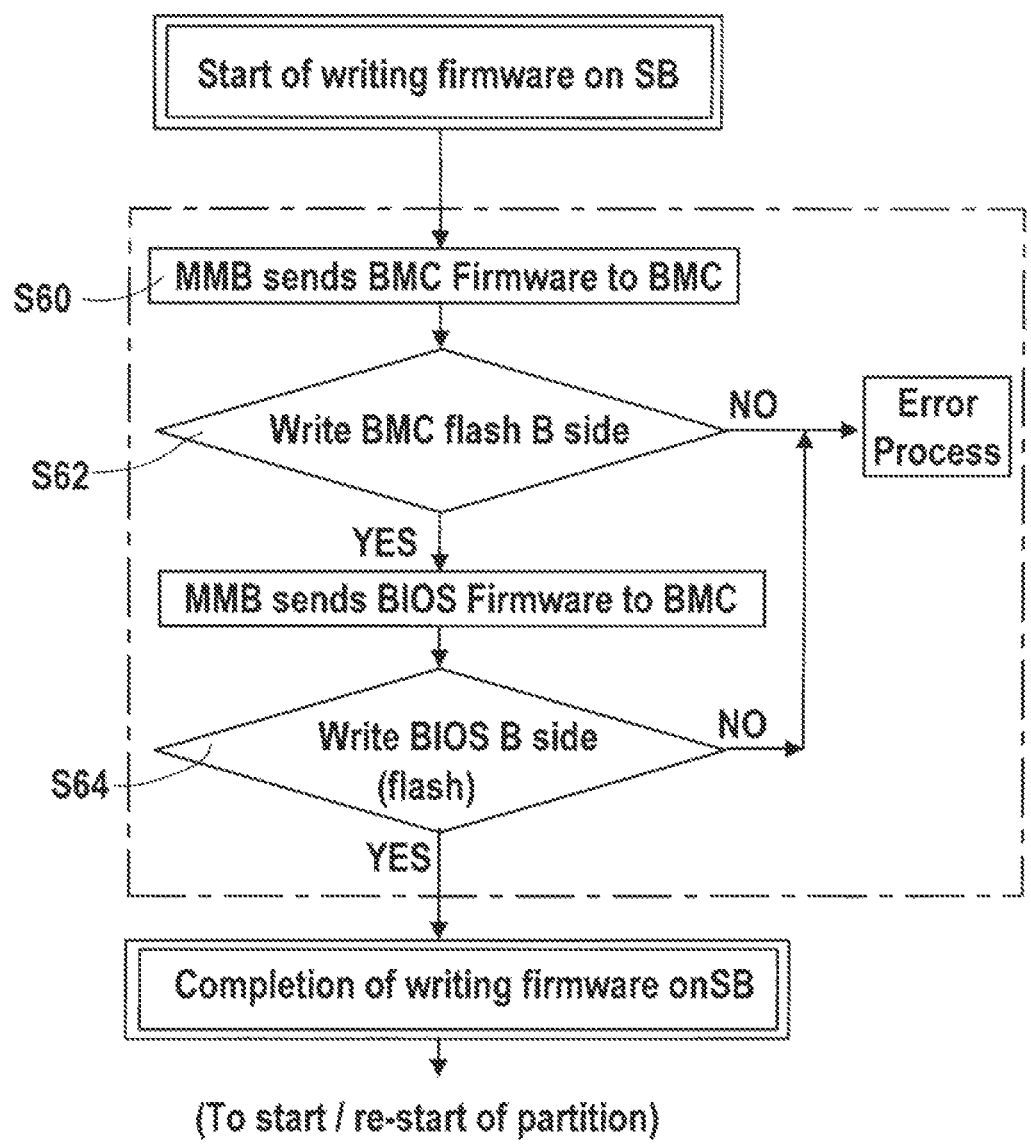
FIG. 9 is a flow diagram of updating process of an BMC firmware and an BIOS firmware in FIG. 3.

Explained next is the updating process of the BMC firmware and the BIOS firmware using the flow diagram of the updating process of the BMC firmware and BIOS firmware in FIG. 9.

(S60) The MMB 2A on the active side instructs the update of the firmware to the BMC 30 existing on each of the system boards 3A to 3D communicating through the communication path 4 such as the I2C interface. The MMB 2A transfers the BMC firmware to the BMC 30 on each of the system boards 3A to 3D through the communication path 4.

(S62) The CPU 32 in the BMC 30 executes the updating process of the firmware. In other words, the CPU 32 in the BMC 30 updates by writing the BMC firmware to the BMC non-volatile memory 37A on the standby side. The CPU 32 in the BMC 30 executes an error process when the writing of the BMC firmware is not successful.

(S64) When the CPU 32 in the BMC 30 determines that the writing of the BMC firmware was successful, the CPU 32 notifies that to the MMB 2A. The MMB 2A transfers the BIOS firmware to the BMC 30 on each of the system boards 3A to 3D through the communication path 4 such as the I2C. The CPU 32 in the BMC 30 updates by writing the BIOS firmware to the BIOS non-volatile memory 36A on the standby side. The CPU 32 in the BMC 30 executes an error process if the writing of the BIOS FW is not successful. The CPU 32 in the BMC 30, when determines that the writing of the BIOS firmware was successful, notifies that to the MMB 2A. By that, the writing of the firmware on the system board is completed.

As explained above, the MMB 2A can complete the writing of the firmware on all system boards 3A to 3D without stopping the operations of each partition, as the MMB 2A writes and updates the BMC firmware and BIOS firmware to only the non-volatile memory on the standby side which is not used for the operation of the system board.

<Firmware Updating Process in Case of Existence of Non-Compatibility>

Figure 10:
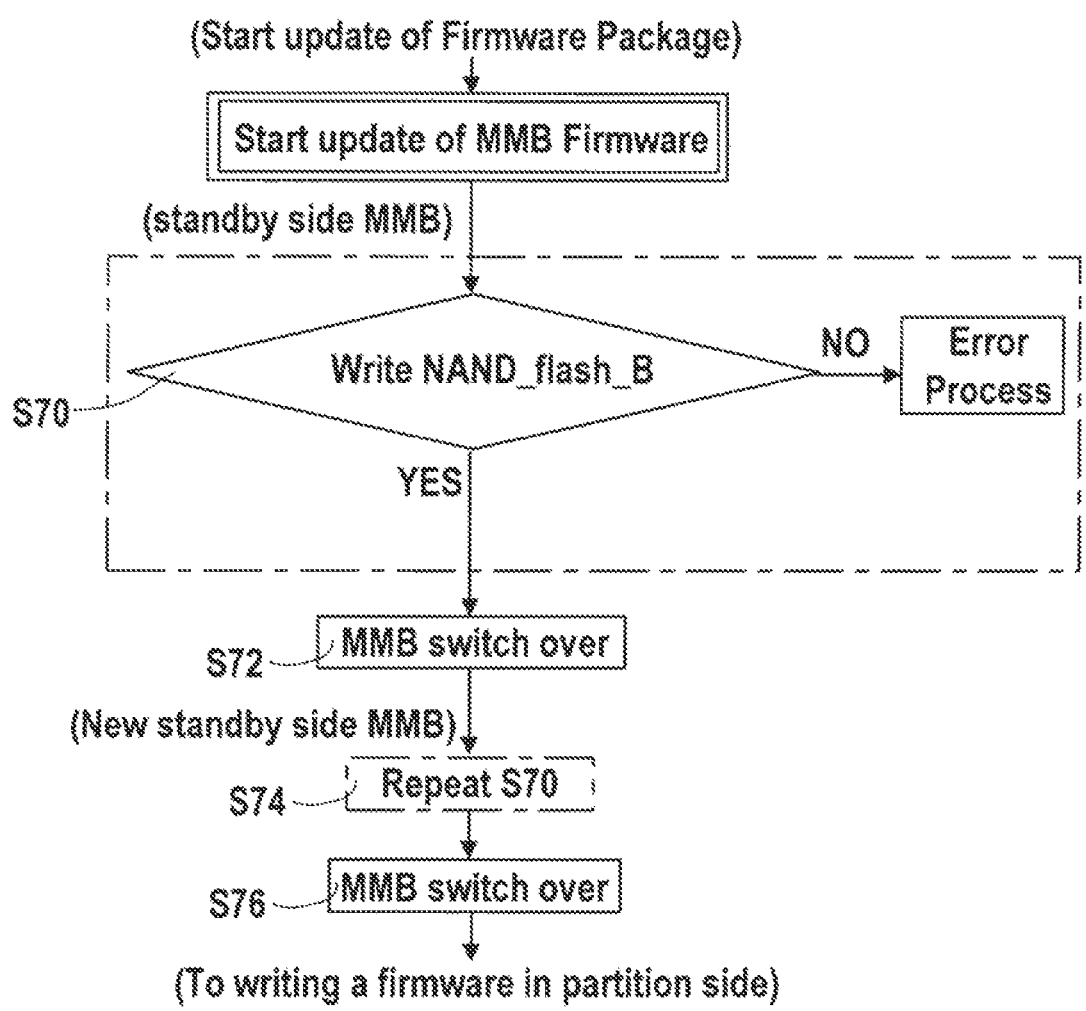
FIG. 10 is the flow diagram of a MMB firmware updating process in case of non-compatibility explained in FIG. 3.
Figure 11:
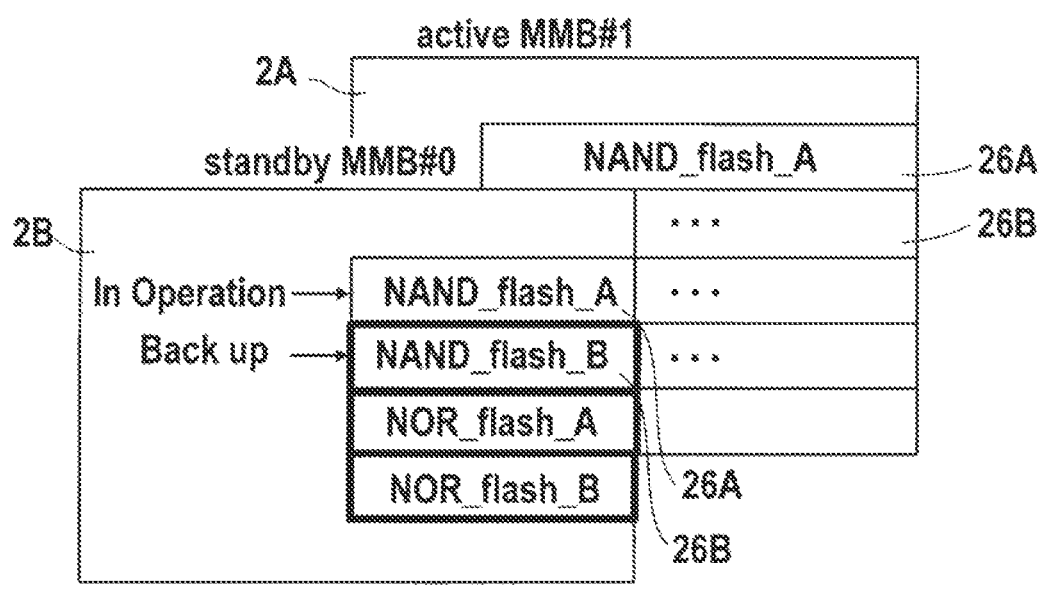
FIG. 11 is an explanatory diagram of operation in FIG. 10.

Next, explained in detail is the firmware updating processes (S24, S26, S28, S30, and S32) in the situation of existing non-compatibility explained in FIG. 3. FIG. 10 is the flow diagram of the MMB firmware updating process in case of non-compatibility explained in FIG. 3. FIG. 11 is the explanatory diagram of the operation in FIG. 10. Hereinafter, the process flow of FIG. 10 will be explained referring to FIG. 11.

(S70) The MMB 2A on the active side, when the normal online is possible (when there is non-compatibility between firmware), executes the firmware update of the MMB. In other words, as illustrated in FIG. 11, the MMB 2A on the active side writes the MMB firmware to the MMB firmware area 44 in the non-volatility memory 26B (indicated as NAND flash B) on the backup side in the MMB 2B on the standby side. The MMB 2A executes an error process if the writing of the MMB FW is not successful.

(S72) The MMB 2A, when determines that the writing of the MMB FW was successful, switches the MMB 2B on the standby side to the active side, and the MMB 2A to the standby side.

(S74) The MMB 2B, which has been switched to the active side, executes the step S70 process to the MMB 2A which has been switched to the standby side.

(S76) The MMB 2B, when determines that the activation of the MMB 2A on the standby side is successfully completed, switches the MMB 2A on the standby side to the active side, and the MMB 2B itself on the active side to the standby side to place them back to where they were. By that, the update of the MMB firm is completed.

As explained above, when there is non-compatibility between firmware, only the non-volatile memory 26B on the standby side on the MMBs 2A and 2B update the MMB firmware. Accordingly, the update can be executed to the non-compatible firmware without influencing the system management and control executed by the MMB 2A.

Figure 12:
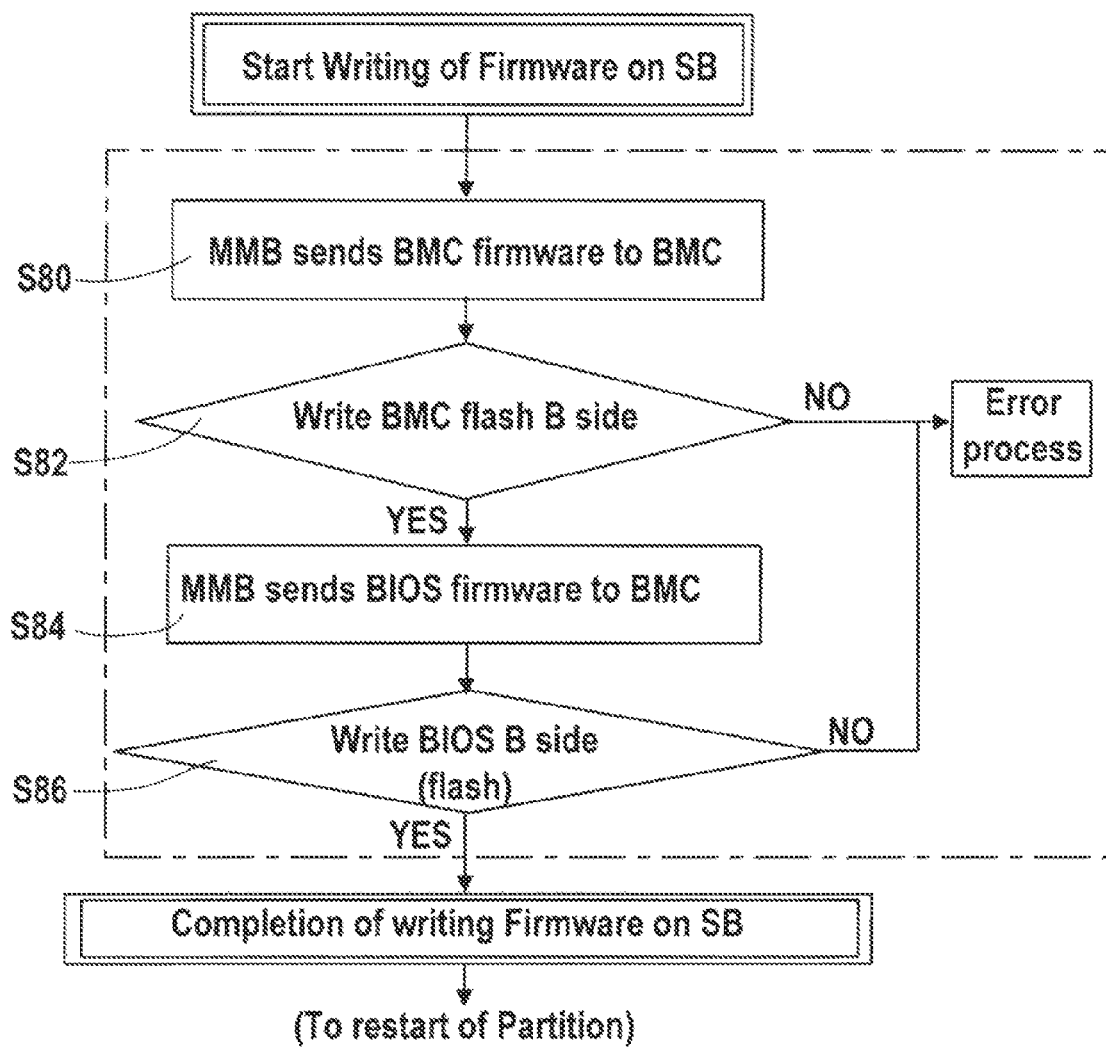
FIG. 12 is a flow diagram of updating process of the BMC FW and the BIOS FW explained in FIG. 3.

Next, the updating process of the non-compatible BMC firmware and the BIOS firmware will be explained with the flow diagram of the updating process of the BMC firmware and the BIOS firmware in FIG. 12.

(S80) The MMB 2A on the active side instructs to update the firmware to the BMC 30 existing on each of the system boards 3A to 3D communicating through the communication path 4 such as the I2C interface. The MMB 2A transfers the BMC firmware to the BMC 30 on each of the system boards 3A to 3D through the communication path 4 such as the I2C interface.

(S82) The CPU 32 in the BMC 30 executes the update of the BMC firmware. In other words, the CPU 32 in the BMC 30 writes and updates the BMC firmware to the BMC non-volatile memory 37A on the standby side. The CPU 32 in the BMC 30 executes an error process if the writing of the BMC firmware is not successful.

(S84) The CPU 32 in the BMC 30, when determines that the writing of the BMC firmware was successful, notifies that to the MMB 2A. The MMB 2A transfers the BIOS firmware to the BMC 30 on each of the system boards 3A to 3D through the communication path 4 such as the I2C. The CPU 32 in the BMC 30 writes and updates the BIOS firmware to the BIOS non-volatile memory 36A on the standby side. The CPU 32 in the BMC 30 executes an error process if the writing of the BMC firmware is unsuccessful. The CPU 32 in the BMC 30, when determines that the writing of the BMC firmware was successful, notifies that to the MMB 2A. By that, the writing of the FW on the SB is completed.

As explained above, the MMB 2A updates by writing the firmware to only the non-volatile memory on the standby side not used for the operation of the system board, so the writing of the firmware to all of the system boards 3A to 3D can be completed without stopping the operation of each partition.

Figure 13:
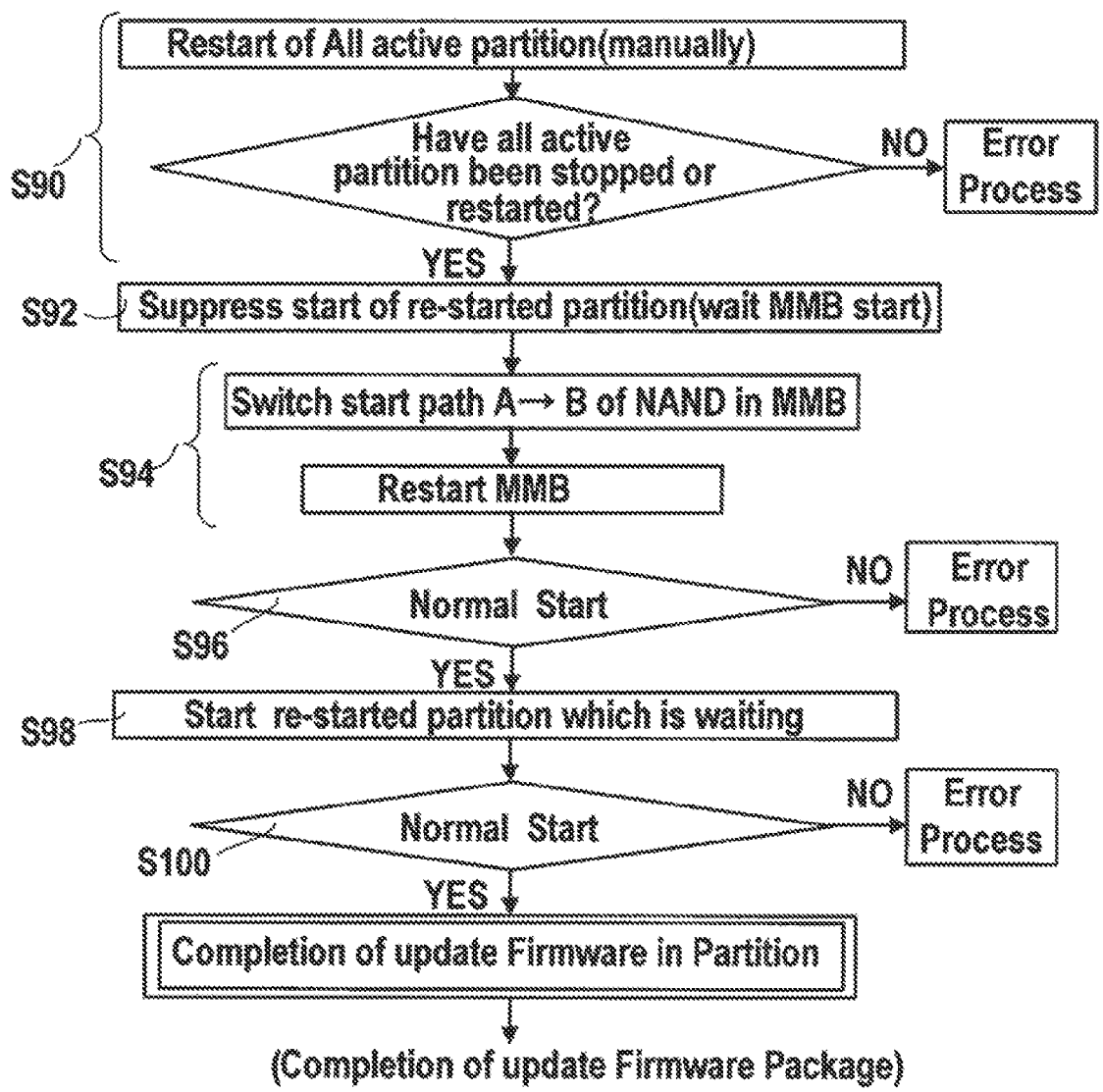
FIG. 13 is a flow diagram of detailed process of the steps S28, S30 and S32 explained in FIG. 3.

Next, FIG. 13 is the flow diagram of detailed process of the steps S28, S30 and S32 in FIG. 3.

(S90) The remote PC 9 instructs the MMB 2A to re-start all of the partitions in operation. The MMB 2A instructs all partitions in operation to initiate re-start (start) and confirms whether or not all partitions in operation are stopped and re-started. The MMB 2A executes an error process if all of the partitions in operation are stopped or not re-started.

(S92) The MMB 2A suppresses (pauses) the activation of the partitions instructed to be re-started for waiting for the activation of the MMB.

(S94) The MMB 2A, when confirms the pausing of the re-start of the partition, switches the activation path of the MMB firmware. In other words, the MMB 2A switches the non-volatile memory 26B on the backup side, of which the firmware is updated, to the active side, reads the MMB firmware of the non-volatile memory 26B, and then executes the re-start of the MMB 2A.

(S96) The MMB 2A confirms whether or not the activation (start) was processed normally. The MMB 2A executes an error process if the activation is not processed normally.

(S98) The MMB 2A, when determines that the activation was processed normally, re-starts the partition which has been suppressed.

(S100) The MMB 2A confirms whether or not the partition was started normally. As the BMC 30 has confirmed that the firmware had been updated at the step S26, the partitions is re-started by switching the BIOS non-volatile memory 36A on the standby side to the active side and the BMC non-volatile memory 37A on the standby side to the active side and then reading the BMC firmware and the BIOS firmware which have been updated, The MMB 2A executes an error process when the partition does not start normally. On the other hand, the MMB 2A, when the partition started normally, determines that the firmware update of the partition is completed.

As explained above, when the firmware is non-compatible, each partition is stopped, re-started, and determined whether the activation was done normally after updating the firmware. Therefore, the down time of the partition in operation can be shortened even when updating to the non-compatible firmware.

<Other Embodiment>

Though the above embodiment was explained using the method of detecting whether there is non-compatibility between firmware and selecting the updating process by non-compatibility and compatibility result of the detection, it may be applicable to select the updating process for the situation where the non-compatibility exists between firmware even when there is compatibility between firmware. In that case, the detection of compatibility is not necessarily needed.

Also, regarding the re-start of a plurality of partitions, it is possible, for example, to interlock the restart to scheduled operation of the stop and start of the partition. The firmware to be updated may not be limited to the MMB, the BMC, and the BIOS, and only one or two of them, or other necessary firmware maybe added.

Because the management unit, which monitors the partition in operation, receives the firmware and writes it to the memory area which is not used for the operation out of the pair of memory areas, it is possible to update the firmware in the partition without stopping the operation of each partition.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A firmware updating method of an information processing device having a plurality of processing units including an arithmetic processing unit and a storage unit and a system control unit that controls the plurality of processing units, the method comprising:
   receiving an update firmware program from an external device by the system control unit;
   transmitting the update firmware program to each of the processing units from the system control unit;
   writing the update firmware program to one memory area not used for an operation out of a pair of memory areas of the processing unit for storing a firmware program that manages the hardware resource by the processing unit;
   detecting a version of the firmware program used in operation in the pair of memory area of each processing device and judging whether there is compatibility with the update firmware program before writing the update firmware program;
   instructing a start or re-start to the processing units from the system control unit after writing the update firmware program when judging that the firmware program is not compatible with the update firmware program; and
   switching the one memory area not used for the operation to the operation side and starting or re-starting by the update firmware program in the one memory area of the processing devices, which are instructed to perform the start or the re-start, wherein the receiving comprises receiving a package of the update firmware program of the processing unit and a second firmware program that controls a hardware resource in the system control unit,
   said method further comprises:
   writing the received second firmware program in one memory area not used in operation among a pair of second memory areas provided to the system control unit before transmitting the update firmware program of the processing unit to each of the processing unit.

2. The firmware updating method according to claim 1, wherein the transmitting comprises:
   transmitting the update firmware program of the processing unit and a third firmware program for a management unit to the processing unit comprising the management unit managing the hardware resource in the processing unit and a pair of third memory area that each stores the third firmware program for the management unit, and
   wherein the writing comprises:
   writing the received third firmware program in one memory area not used in operation among the pair of third memory area; and
   writing the update firmware program of the processing unit to one memory area not used for the operation out of the pair of memory areas.

3. The firmware updating method according to claim 1, wherein the receiving comprises:
   receiving the update firmware program including a compatibility table for determining whether or not compatibility exists between the firmware programs.

4. The firmware updating method according to claim 1, further comprises:
   writing the second firmware program in another memory area among the pair of second memory areas after writing received the second firmware program in one memory area not used in operation among the pair of second memory areas.

5. The firmware updating method according to claim 1, further comprises:

detecting a version of the firmware program used in operation of each processing device;

judging whether there is compatibility with the update firmware program before writing the update firmware program; and writing the received second firmware program only in the one memory area not used in operation among the pair of second memory areas when judging there is not compatible.

6. The firmware updating method according to claim 1, wherein the writing comprises:

writing the received second firmware program in one memory area not used in operation among the pair of second memory areas of a second system control unit on a standby side among the system control unit comprises a pair of the system control unit including a first system control unit and the second system control unit, by the first system control unit on an active side;

switching the second system control unit to the active side and the first system control unit to the standby side; and writing the second firmware program in one memory area not used in operation among the pair of second memory areas of the first system control unit switched to the standby side by the second system control unit switched to the active side.

7. An information processing device comprises:

a plurality of processing units, each having a hardware resource including an arithmetic processing unit and a storage unit; and a system control unit that controls the plurality of processing units, wherein each of the processing units has a pair of memory areas that store a firmware program controlling the hardware resource, the system control unit transmits an update firmware program received from an external device to each of the processing units, and each of the processing units writes the update firmware program to one memory area not used for the operation out of the pair of memory areas, and wherein the system control unit detects a version of the firmware program used in operation in the pair of memory area of each processing device, judges whether the firmware program is compatible with the update firmware program before writing the update firmware program, and instructs a start or re-start to the processing units after writing the update firmware program when judging that the firmware program is not compatible with the update firmware program, and the processing devices, which are instructed to perform the start or the re-start, switch the one memory area not used for the operation to the operation side and start or re-start by the update firmware program in the one memory area, wherein the system control unit further comprises a pair of second memory areas, each storing a second firmware program that controls a hardware resource in the system control unit, and the system control unit receives a package of the update firmware program of the processing unit and the second firmware program, writes the received second firmware program in one memory area not used in operation among the pair of second memory areas of the system control unit, and transmits the update firmware program of the processing unit to each of the processing unit.

8. The information processing device according to claim 7, wherein the processing unit further comprises:

a management unit that manages the hardware resource in the processing unit; and a pair of third memory area that each stores a third firmware program for the management unit, wherein the management unit receives the update firmware program of the processing unit and the third firmware program, writes the received third firmware program in one memory area not used in operation among the pair of third memory area, and writes the update firmware program of the processing unit to one memory area not used for the operation out of the pair of memory areas.

9. The information processing device according to claim 7, wherein the system control unit receives the update firmware program including a compatibility table for determining whether compatibility exists between the firmware programs.

10. The information processing device according to claim 7, wherein the system control unit writes the received second firmware program in one memory area not used in operation among the pair of second memory areas, and then writes the second firmware program in another memory area among the pair of second memory areas.

11. The information processing device according to claim 7, wherein the system control unit detects a version of the firmware program used in operation of each processing device and judges whether the firmware program is compatible with the update firmware program before writing the update firmware program, and the system control unit writes the received second firmware program only in the one memory area not used in operation among the pair of second memory areas when judging there is no compatibility.

12. The information processing device according to claim 7, wherein the system control unit comprises a pair of the system control unit including a first system control unit and a second system control unit, a first system control unit on an active side writes the received second firmware program in one memory area not used in operation among the pair of second memory areas of the second system control unit on a standby side, and switches the second system control unit to the active side and the first system control unit to the standby side, and the second system control unit switched to the active side writes the second firmware program in one memory area not used in operation among the pair of second memory areas of the first system control unit switched to the standby side.

* * * * *